(12) United States Patent
Tanaka et al.

(10) Patent No.: US 10,691,472 B2
(45) Date of Patent: Jun. 23, 2020

(54) USER INTERFACE EXECUTION APPARATUS AND USER INTERFACE DESIGNING APPARATUS

(71) Applicant: Mitsubishi Electric Corporation, Chiyoda-ku (JP)

(72) Inventors: Kohei Tanaka, Tokyo (JP); Yoshiaki Kitamura, Tokyo (JP); Akira Toyooka, Tokyo (JP); Mitsuo Shimotani, Tokyo (JP); Yukio Goto, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 399 days.

(21) Appl. No.: 15/541,158

(22) PCT Filed: Feb. 27, 2015

(86) PCT No.: PCT/JP2015/055912
§ 371 (c)(1),
(2) Date: Jun. 30, 2017

(87) PCT Pub. No.: WO2016/135960
PCT Pub. Date: Sep. 1, 2016

(65) Prior Publication Data
US 2017/0371685 A1 Dec. 28, 2017

(51) Int. Cl.
*G06F 9/451* (2018.01)
*G06F 12/0804* (2016.01)
(Continued)

(52) U.S. Cl.
CPC ............... *G06F 9/451* (2018.02); *G06F 8/38* (2013.01); *G06F 9/30047* (2013.01);
(Continued)

(58) Field of Classification Search
CPC .......... G06F 11/1446; G06F 8/35; G06F 8/38; G06F 9/30047; G06F 9/451;
(Continued)

(56) References Cited

U.S. PATENT DOCUMENTS 6,438,656 B1 * 8/2002 Arimilli ............... G06F 12/0862
711/137
7,385,585 B2 6/2008 Konaka et al.
(Continued)

FOREIGN PATENT DOCUMENTS

JP 2002-244848 A 8/2002
JP 2006-343846 A 12/2006
(Continued)

OTHER PUBLICATIONS

Fleming et al., "Optimizing Under Abstraction: Using Prefetching to Improve FPGA Performance", 2013, Computer Science and A.I. Laboratory Massachusetts Institute of Technology, and VSSAD Group Intel Corporation, IEEE, pp. 8 (Year: 2013).*
(Continued)

*Primary Examiner* — Chau T Nguyen
(74) *Attorney, Agent, or Firm* — Oblon, McClelland, Maier & Neustadt, L.L.P.

(57) ABSTRACT

The present invention has an object of providing a user interface execution apparatus and a user interface designing apparatus which can estimate the maximum size of a storage area for storing data to be prefetched when a user interface is designed and can present updated data to the user even when the prefetched data is updated after the prefetch. A user interface execution apparatus in the present invention includes a processor to execute a program; and a memory to store the program which, when executed by the processor, performs processes of: transitioning a state of the user interface execution apparatus; issuing a prefetch request for
(Continued)

data; storing the data; generating the code from an interface definition and a state transition definition; and selecting, before transitioning the state, data to be prefetched based on a difference between a data obtaining interface to be used in a state before the transitioning and a data obtaining interface to be used in a state after the transitioning.

6 Claims, 15 Drawing Sheets

(51) Int. Cl.
*H04L 29/08* (2006.01)
*G06F 12/0862* (2016.01)
*G06F 8/38* (2018.01)
*G06F 9/30* (2018.01)
*G06F 11/14* (2006.01)
*G06F 8/35* (2018.01)

(52) U.S. Cl.
CPC ...... *G06F 11/1446* (2013.01); *G06F 12/0804* (2013.01); *G06F 12/0862* (2013.01); *H04L 29/0881* (2013.01); *H04L 29/08819* (2013.01); *H04L 67/2847* (2013.01); *G06F 8/35* (2013.01); *G06F 2212/6028* (2013.01)

(58) Field of Classification Search
CPC ............. G06F 12/0862; G06F 12/0804; G06F 2212/6028; H04L 29/0881; H04L 29/08819; H04L 67/2847
See application file for complete search history.

(56) References Cited

U.S. PATENT DOCUMENTS

| | | | |
|---|---|---|---|
| 7,664,928 B1* | 2/2010 | Andrews | G06F 9/30043 712/14 |
| 8,059,092 B2 | 11/2011 | Konaka et al. | |
| 8,924,657 B2 | 12/2014 | Kikuchi | |
| 2009/0300320 A1* | 12/2009 | Zhang | G06F 12/0862 711/213 |
| 2012/0159115 A1* | 6/2012 | Cha | G06F 12/0653 711/203 |
| 2012/0174123 A1* | 7/2012 | Daniel | G06F 8/00 719/328 |

FOREIGN PATENT DOCUMENTS

| | | |
|---|---|---|
| JP | 2010-231570 A | 10/2010 |
| JP | 2010-282430 A | 12/2010 |
| JP | 2011-141867 A | 7/2011 |
| JP | 2013-218371 A | 10/2013 |

OTHER PUBLICATIONS

International Preliminary Report on Patentability and Written Opinion dated Sep. 8, 2017 in PCT/JP2015/055912 filed Feb. 27, 2015 (with English translation).
International Search Report dated May 19, 2015 in PCT/JP2015/055912 filed Feb. 27, 2015.

* cited by examiner

| key | value |
|---|---|
| DataA | 1234 |
| StringB | ABCDE |
| ListC_length_1 | 100 |
| ListC_name_1 | playlist1 |
| ListC_item_1_1 | {"artistA","songA"} |
| : | : |
| ListC_item_1_10 | {"artistA","songJ"} |
| StateD | {"moving",1} |

F I G. 10

| key | subscribed |
|---|---|
| DataA | true |
| StringB | false |
| ListC_length_1 | true |
| ListC_name_1 | true |
| ListC_item_1_1 | true |
| ⋮ | ⋮ |
| ListC_item_1_10 | true |
| StateD | true |

FIG. 13

| key | client |
|---|---|
| DataA | clientA |
| StringB | clientA |
| DataA | clientB |
| : | : |

F I G. 15

| key | device ID |
|---|---|
| DataA | device1 |
| DataA | device2 |
| StringB | device1 |
| ListC_length_1 | device1 |
| ListC_name_1 | device1 |
| ListC_item_1_1 | device1 |
| ⋮ | ⋮ |
| ListC_item_1_10 | device1 |
| StateD | device1 |

F I G. 1 7

```
serviceA{
    int getDataA() fixed;
    string getStringB() periodic;
    List getListC() periodic;
    State getStateD() periodic;
    void doSomething();
    void OnNotifyE2()
        :
        :
}
```

F I G. 1 8

| key | value | type |
| --- | --- | --- |
| DataA | 1234 | fixed |
| StringB | ABCDE | periodic |
| ListC_length_1 | 100 | fixed |
| ListC_name_1 | playlist1 | fixed |
| ListC_item_1_1 | {"artistA","songA"} | fixed |
| : | : | : |
| ListC_item_1_10 | {"artistA","songJ"} | fixed |
| StateD | {"moving",1} | fixed |

USER INTERFACE EXECUTION APPARATUS AND USER INTERFACE DESIGNING APPARATUS

TECHNICAL FIELD

The present invention relates to a user interface (UI) designing apparatus that designs a user interface of built-in equipment, and to a user interface execution apparatus that executes the user interface based on a code generated by the user interface designing apparatus.

BACKGROUND ART

Conventional user interface execution apparatuses prestore the content requiring some reading time in a storage area requiring no reading time to increase the responsiveness of reading the content in a user operation and alleviate the stress of the user caused by the reading time. Prestoring information such as content in a storage area requiring no reading time will be hereinafter referred to as prefetch. Although it is necessary to allocate a sufficiently large storage area for prefetching all data content, generally, the storage area is finite. Thus, allocating a storage area for prefetching all the data content is unrealistic. Consequently, the data needs to be prefetched in a storage area based on selection of data to be prefetched and the start timing of the prefetch.

Conventionally, a technique of prefetching display data upon determination that a foreground job is in a nonexecution state has been disclosed (see, for example, Patent Document 1). Furthermore, a technique of determining data to be prefetched with reference to predefined code information upon input operation by the user has been disclosed, where the code information indicates associations between types of input operations by the user and data reading conditions (see, for example, Patent Document 2).

PRIOR-ART DOCUMENTS

Patent Documents

Patent Document 1: Japanese Patent Application Laid-Open No. 2011-141867
Patent Document 2: Japanese Patent Application Laid-Open No. 2010-282430

SUMMARY

Problems to be Solved by the Invention

The conventional user interface execution apparatuses neither dynamically determines data to be prefetched upon execution of a user interface nor defines the timing of canceling the prefetched data. Thus, there has been a problem with difficulty in estimating the maximum size of a storage area for holding the prefetched data when the user interface is designed. Furthermore, there has been a problem in that old data before prefetching the data may be presented to the user even when the data is changed after the prefetch, because of no consideration of change in the prefetched data after the prefetch.

The present invention has been conceived to solve such problems, and has an object of providing a user interface execution apparatus and a user interface designing apparatus both of which can estimate the maximum size of a storage area for storing data to be prefetched when a user interface is designed and can present updated data to the user even when the prefetched data is updated after the prefetch.

Means to Solve the Problems

In order to solve the problems, a user interface execution apparatus according to the present invention is a user interface execution that executes operation content of a user based on a code generated by a user interface designing apparatus that designs a user interface, the user interface execution apparatus including a processor to execute a program; and a memory to store the program which, when executed by the processor, performs processes of: transitioning a state of the user interface execution apparatus based on the code and the operation content of the user; issuing a prefetch request for data to a data providing unit, the prefetch request being generated by the user interface designing apparatus based on a data obtaining interface included in the code statically defined in association with the state of the user interface execution apparatus; storing the data obtained from the data providing unit in response to the prefetch request issued in the issuing; generating the code from an interface definition defined as an interface between the user interface execution apparatus and the data providing unit, and a state transition definition that defines the transitioning of a state, the interface definition and the state transition definition being designed by the user interface designing apparatus; and selecting, before transitioning the state, data to be prefetched based on a difference between a data obtaining interface to be used in a state before the transitioning and a data obtaining interface to be used in a state after the transitioning.

Furthermore, a user interface designing apparatus according to the present invention is a user interface designing apparatus that designs a user interface, the apparatus including a processor to execute a program; and a memory to store the program which, when executed by the processor, performs processes of: defining transitioning of a state of the user interface; defining an interface definition that defines an interface between a user interface execution apparatus and a data providing unit, the user interface execution apparatus executing the user interface, the data providing unit providing data to the user interface execution apparatus; and automatically generating a code for issuing both a prefetch request and a prefetch cancellation request for the data to the data providing unit, based on the state transition definition and the interface definition defined in the defining of an interface definition, the state transition definition including a correspondence definition that defines a correspondence of the interface that may be used in each state defined in the defining of a state transition definition.

Effects of the Invention

The user interface execution apparatus according to the present invention is a user interface execution that executes operation content of a user based on a code generated by a user interface designing apparatus that designs a user interface, the user interface execution apparatus including a processor to execute a program; and a memory to store the program which, when executed by the processor, performs processes of: transitioning a state of the user interface execution apparatus based on the code and the operation content of the user; issuing prefetch request for data to a data providing unit, the prefetch request being generated by the user interface designing apparatus based on a data obtaining interface included in the code statically defined in association with the state of the user interface execution apparatus; storing the data obtained from the data providing unit in response to the prefetch request issued in the issuing; generating the code from an interface definition defined as an interface between the user interface execution apparatus and the data providing unit, and a state transition definition that defines the transitioning of a state, the interface definition and the state transition definition being designed by the user interface designing apparatus; and selecting, before transitioning the state, data to be prefetched based on a difference between a data obtaining interface to be used in a state before the transitioning and a data obtaining interface to be used in a state after the transitioning. Thus, the maximum size of a storage area for storing data to be prefetched can be estimated when a user interface is designed, and updated data can be presented to the user even when the prefetched data is updated after the prefetch.

Furthermore, the user interface designing apparatus according to the present invention is a user interface designing apparatus that designs a user interface, the apparatus including a processor to execute a program; and a memory to store the program which, when executed by the processor, performs processes of: defining a state transition definition that defines transitioning of a state of the user interface; defining an interface definition that defines an interface between a user interface execution apparatus and a data providing unit, the user interface execution apparatus executing the user interface, the data providing unit providing data to the user interface execution apparatus; and automatically generating a code for issuing both a prefetch request and a prefetch cancellation request for the data to the data providing unit, based on the state transition definition and the interface definition defined in the defining of an interface definition, the state transition definition including a correspondence definition that defines a correspondence of the interface that may be used in each state defined in the defining of a state transition definition. Thus, the maximum size of a storage area for storing data to be prefetched can be estimated when a user interface is designed, and updated data can be presented to the user even when the prefetched data is updated after the prefetch.

The objects, features, aspects and advantages of the present invention will become more apparent from the following detailed description and the accompanying drawings.

BRIEF DESCRIPTION OF DRAWINGS

FIG. 10 illustrates example prefetch management data managed by a prefetch management unit according to Embodiment 1 of the present invention.

FIG. 13 illustrates an example client management table managed by a data storage according to Embodiment 3 of the present invention.

FIG. 15 illustrates example management data managed by a prefetch management unit according to Embodiment 4 of the present invention.

FIG. 17 illustrates an example setting of a flag indicating a data type of a data obtainment interface in an interface definition according to Embodiment 5 of the present invention.

FIG. 18 illustrates an example data format managed by a data storage according to Embodiment 5 of the present invention.

DESCRIPTION OF EMBODIMENTS

Embodiments of the present invention will be described with reference to the drawings.

Embodiment 1

[Configuration]

Figure 1:
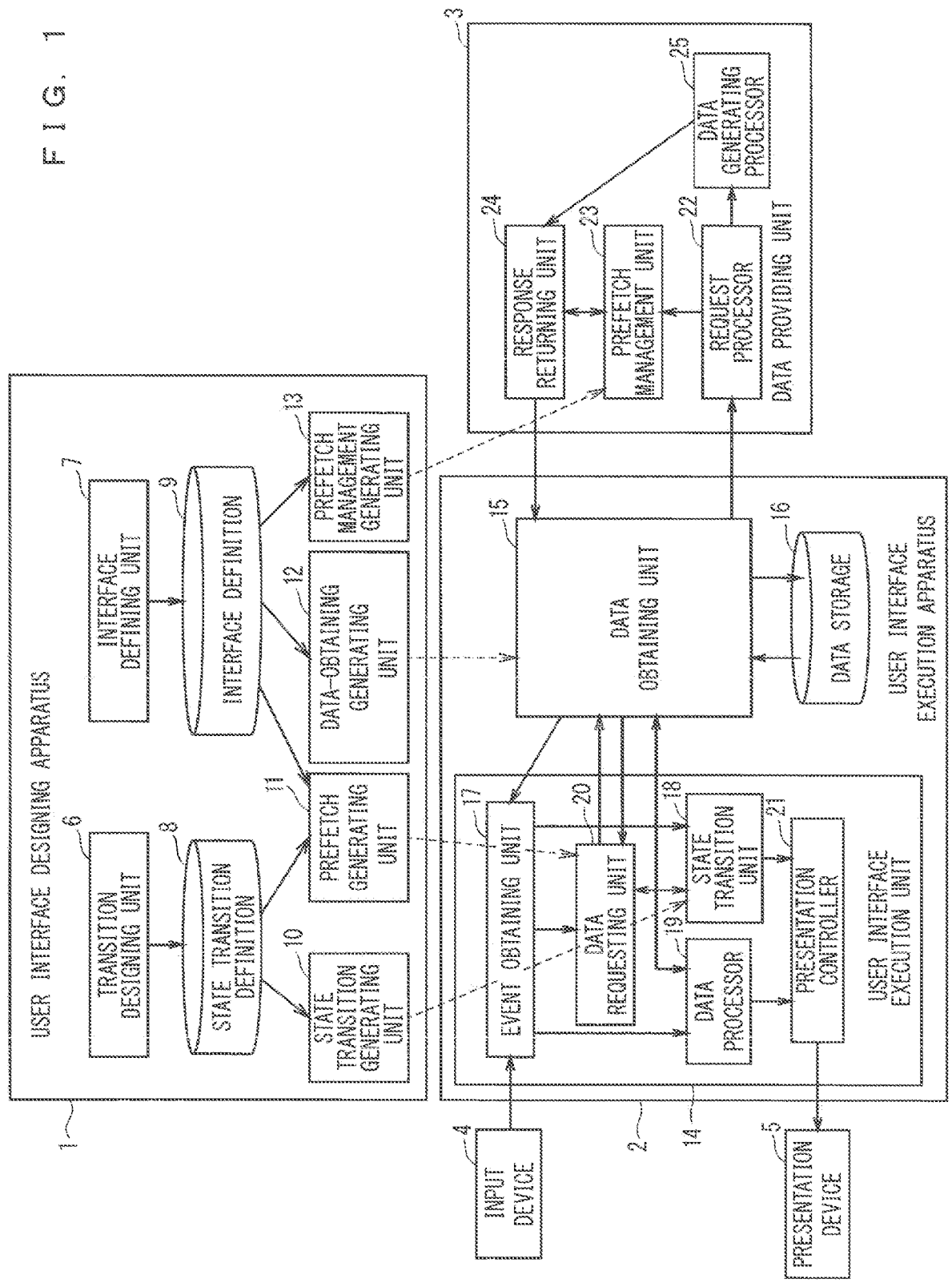
FIG. 1 is a block diagram illustrating an example configuration of a user interface designing apparatus, a user interface execution apparatus, and a data providing unit according to Embodiment 1 of the present invention.

FIG. 1 is a block diagram illustrating an example configuration of a user interface designing apparatus 1, a user interface execution apparatus 2, and a data providing unit 3 according to Embodiment 1 of the present invention. In FIG. 1, solid arrows represent data flows between the constituent elements, and dashed arrows represent respective flows of codes generated by a state transition generating unit 10, a prefetch generating unit 11, a data-obtaining generating unit 12, and a prefetch management generating unit 13.

First, the configuration of the user interface designing apparatus 1 will be described.

The user interface designing apparatus 1 is an apparatus used by a user interface designer, and includes a transition designing unit 6, an interface defining unit 7, the state transition generating unit 10, the prefetch generating unit 11, the data-obtaining generating unit 12, and the prefetch management generating unit 13.

The transition designing unit 6 (state transition defining unit) designs a state of a user interface. Specifically, the transition designing unit 6 creates a state transition definition 8 based on an input by the user interface designer. In other words, the transition designing unit 6 defines the state transition definition 8 that defines a state transition of the user interface.

The interface defining unit 7 defines an interface definition 9 between a user interface execution unit 14 of the user interface execution apparatus 2 and the data providing unit 3 that provides the user interface execution unit 14 with data. The state transition definition 8 can define, from within the interface definition 9 defined by the interface defining unit 7, an interface group that may be used in a particular state.

The state transition generating unit 10 generates a state transition code 30 (see FIG. 3) that is a source code of software that processes a state transition of the user interface execution unit 14 of the user interface execution apparatus 2, based on the state transition definition 8. The generated state transition code 30 is passed to a state transition unit 18 of the user interface execution apparatus 2.

The prefetch generating unit 11 generates, in a predetermined interface state, a prefetch execution code 31 (see FIG. 3) that is a source code of software that executes at least one of a prefetch request and a prefetch cancellation request that is issued by the user interface execution unit 14 of the user interface execution apparatus 2, based on the state transition definition 8 and the interface definition 9. The prefetch request means requesting the data providing unit to provide data that may be necessary in the predetermined interface state. Furthermore, the prefetch cancellation request means stopping (canceling) the prefetch request to the data providing unit. The predetermined interface state includes an interface state obtained after a predetermined number of transitions. The generated prefetch execution code 31 is passed to a data requesting unit 20 of the user interface execution apparatus 2. The prefetch request and the prefetch cancellation request will be described later.

The data-obtaining generating unit 12 generates an accumulated data access code 32 (see FIG. 3) that is a source code of software to be an interface to a data storage 16 that accumulates data provided from the data providing unit 3 and that is included in the user interface execution apparatus 2, based on the interface definition 9. The generated accumulated data access code 32 is passed to a data obtaining unit 15 of the user interface execution apparatus 2.

The prefetch management generating unit 13 generates a prefetch management code 33 (see FIG. 3) that is a source code of software for managing a prefetch state of data in the user interface execution apparatus 2, based on the interface definition 9. The generated prefetch management code 33 is passed to a prefetch management unit 23 of the data providing unit 3.

Next, the configuration of the user interface execution apparatus 2 will be described.

The user interface execution apparatus 2 includes the user interface execution unit 14, the data obtaining unit 15, and the data storage 16. The user interface execution apparatus 2 controls a presentation device 5 that presents a result of a user interface process, when triggered by an input from an input device 4 that directly receives an input operation of the user or by receipt of data from the data providing unit 3.

The user interface execution unit 14 includes an event obtaining unit 17, the state transition unit 18, a data processor 19, the data requesting unit 20, and a presentation controller 21.

The event obtaining unit 17 obtains, as an event, an input from the input device 4, receipt of data from the data providing unit 3, or the like. The events processed by the event obtaining unit 17 are classified into state transition events for transitioning a state of a user interface, operation events for the data providing unit 3, and input data events for using input signals from the input device 4 for presentation control as they are. The state transition events are passed to the state transition unit 18. The operation events are passed to the data requesting unit 20, and then to the data providing unit 3 through the data obtaining unit 15. The input data events are passed to the data processor 19, and then to the presentation controller 21 as changes in the input data. Examples of the input data events include a process of changing an amount of movement on a screen according to an amount of operations during pressing (an amount of sliding movement) on a touch panel by the user.

The state transition unit 18 receives the state transition code 30 generated by the state transition generating unit 10 of the user interface designing apparatus 1, and transitions a state of an interface based on the received state transition code 30. Furthermore, the state transition unit 18 requests the data requesting unit 20 that has received the prefetch execution code 31 from the prefetch generating unit 11 of the user interface designing apparatus 1 to prefetch data during the state transition.

The data requesting unit 20 accesses data or a function provided by the data providing unit 3, based on instructions from the event obtaining unit 17 and the state transition unit 18. The data requesting unit 20 receives from the event obtaining unit 17 a request for the data providing unit 3 according to an operation event that is not accompanied by a state transition. The data requesting unit 20 receives from the event obtaining unit 17, for example, a request for "starting to play back music". Furthermore, the data requesting unit 20 receives an instruction for a prefetch request from the state transition unit 18.

The data processor 19 processes an event with data that has been processed by the event obtaining unit 17, and the data obtained from the data providing unit 3 through the data obtaining unit 15 to be available for presentation of the user interface. Examples of the event with data include the input data events input from the input device 4, and obtained data events for receiving the data obtained from the data providing unit 3 through the data obtaining unit 15.

The presentation controller 21 generates information to be actually presented to the user by the presentation device 5 and generates a control signal that has been processed so that the presentation device 5 can present it, based on a state of the user interface execution unit 14 and the data processed by the data processor 19. Specifically, the presentation controller 21 obtains the state of the user interface execution unit 14 from the state transition unit 18, and obtains the data to be presented to the user from the data processor 19. The control signal generated by the presentation controller 21 is passed to the presentation device 5. The presentation device 5 presents information corresponding to the signal to the user. According to Embodiment 1, "presentation" contains not only display on a screen but also presentation of music through playing back audio as well as presentation of the sense of force using a tactile device.

Upon receipt of the prefetch request from the data requesting unit 20, the data obtaining unit 15 confirms whether the data storage 16 has the same data as that requested by the data requesting unit 20. When the data storage 16 does not have the same data, the data obtaining unit 15 requests the data providing unit 3 to transmit data that matches the prefetch request. When the data storage 16 has the same data, the data obtaining unit 15 responds success (indication of having the same data) to the data requesting unit 20 without requesting the data providing unit 3.

Upon receipt of a request for obtainment of actual data (data obtainment request) from the data processor 19, the data obtaining unit 15 confirms whether the data storage 16 has the same data as that requested by the data processor 19. When the data storage 16 has the same data, the data obtaining unit 15 returns as a response the same data stored in the data storage 16 without requesting the data providing unit 3 to provide the data. When the data storage 16 does not have the same data, the data obtaining unit 15 returns as a response an error indicating that the data storage 16 does not have the same data.

Furthermore, upon receipt of a request based on an interface different from a data obtainment interface from the data requesting unit 20, the data obtaining unit 15 transmits a request for data to the data providing unit without reference to the data storage 16.

The input device 4 interprets the input operation of the user, and transmits the interpretation to the user interface execution apparatus 2 as an event. Examples of the input device 4 include a touch panel, a mouse, a keyboard, a hardware (H/W) key, a rotary switch, a remote controller, and a speech recognition engine.

The presentation device 5 presents information to the user based on the control signal received from the presentation controller 21. Examples of the presentation device 5 include a device that presents visual information such as a liquid crystal display or a projector, a device that presents audio information such as a speaker or earphones, and a device that presents the sense of force such as a vibrator.

Next, the configuration of the data providing unit 3 will be described.

The data providing unit 3 is a device that provides the user interface execution apparatus 2 with data to be presented by the presentation device 5, and includes a request processor 22, the prefetch management unit 23, a response returning unit 24, and a data generating processor 25.

The request processor 22 receives from the data obtaining unit 15 at least one request of a prefetch request, a prefetch cancellation request, and an instruction request requesting the data providing unit 3 to perform a predetermined process.

The prefetch management unit 23 manages a prefetch state of data in the user interface execution apparatus 2 based on the prefetch management code 33 generated by the prefetch management generating unit 13. Specifically, the management of the prefetch management unit 23 is based on a prefetch request or a prefetch cancellation request received by the request processor 22.

The response returning unit 24 returns data to the data obtaining unit 15 in response to a prefetch request or a data obtainment request received by the request processor 22. Furthermore, upon notification from the data generating processor 25 that data held by the data providing unit 3 has been updated through a process of the data generating processor 25, the response returning unit 24 determines whether the updated data is in a prefetch state with reference to the prefetch management unit 23. When the updated data is in a prefetch state, the response returning unit 24 notifies the data obtaining unit 15 that the data (specifically, a data value) has been updated.

The data generating processor 25 updates the data held by the data providing unit 3 or generates data. These processes are performed by a developer of the data providing unit 3 through describing a program. The data is held by, specifically, a storage (not illustrated) that is included in the data providing unit 3.

Figure 2:
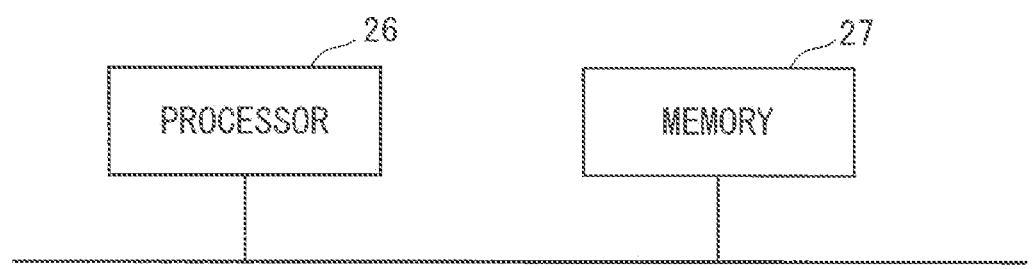
FIG. 2 illustrates an example hardware configuration corresponding to software functions of the user interface designing apparatus, the user interface execution apparatus, and the data providing unit according to Embodiment 1 of the present invention.

FIG. 2 illustrates an example hardware configuration corresponding to software functions of the user interface designing apparatus 1, the user interface execution apparatus 2, and the data providing unit 3 that are illustrated in FIG. 1.

The transition designing unit 6, the interface defining unit 7, the state transition generating unit 10, the prefetch generating unit 11, the data-obtaining generating unit 12, and the prefetch management generating unit 13 in the user interface designing apparatus 1 are implemented as functions of a processor 26 in FIG. 2, for example, by causing the processor 26 to execute programs stored in a memory 27 or the like. These units may be implemented by, for example, the processors 26 in close cooperation with each other.

Furthermore, the user interface execution unit 14, the data obtaining unit 15, the event obtaining unit 17, the state transition unit 18, the data processor 19, the data requesting unit 20, and the presentation controller 21 in the user interface execution apparatus 2 are implemented as functions of the processor 26 in FIG. 2, for example, by causing the processor 26 to execute programs stored in the memory 27 or the like. These units may be implemented by, for example, the processors 26 in close cooperation with each other.

Furthermore, the request processor 22, the prefetch management unit 23, the response returning unit 24, and the data generating processor 25 in the data providing unit 3 are implemented as functions of the processor 26 in FIG. 2, for example, by causing the processor 26 to execute programs stored in the memory 27 or the like. These units may be implemented by, for example, the processors 26 in close cooperation with each other.

The processor 26 and the memory 27 are included in each of the user interface designing apparatus 1, the user interface execution apparatus 2, and the data providing unit 3.

Figure 3:
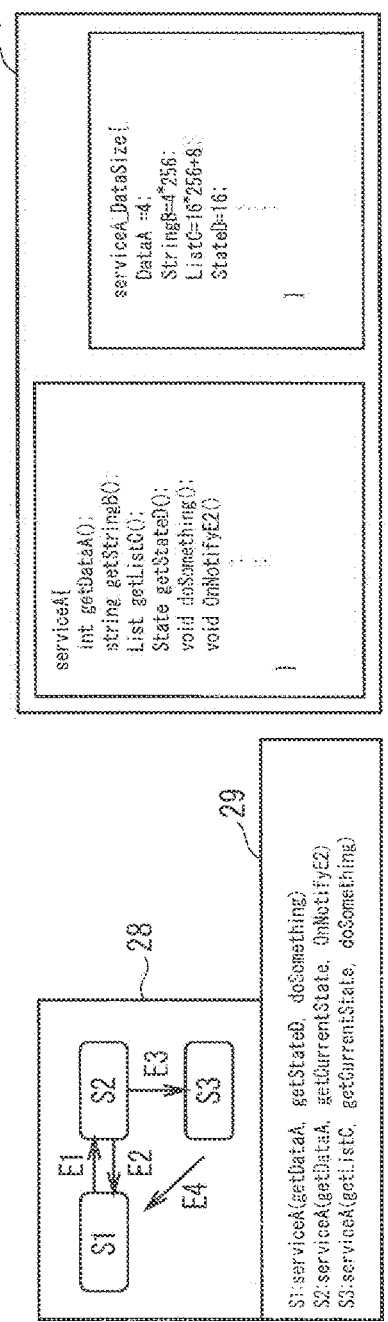
FIG. 3 illustrates an example of an input to the user interface designing apparatus and the generated code according to Embodiment 1 of the present invention.

FIG. 3 illustrates an example of an input to the user interface designing apparatus 1 and the generated code.

The user inputs a design of a user interface to be executed by the user interface execution apparatus 2, into the transition designing unit 6 and the interface defining unit 7.

The user inputs into the transition designing unit 6 a state transition diagram 28 and a correspondence definition 29 that defines correspondences of interfaces used in respective states. The transition designing unit 6 may have the own graphical user interface (GUI) allowing the user to input data, and import a state transition model designed using a tool that edits a Unified Modeling Language (UML). Furthermore, the state transition definition 8 includes the state transition diagram 28 and the correspondence definition 29.

In the example of FIG. 3, the state transition diagram 28 indicates that a state S1 transitions to a state S2 upon receipt of an event E1. Furthermore, the state transition diagram 28 indicates that the state S2 transitions to the state S1 upon receipt of an event E2 and the state S2 transitions to a state S3 upon receipt of an event E3. Furthermore, the state transition diagram 28 indicates that the state S3 transitions to the state S1 upon receipt of an event E4.

The correspondence definition 29 defines the correspondences of interfaces that may be used in the respective states defined in the state transition diagram 28. The correspondence definition 29 may be defined as properties of the respective states defined in the state transition diagram 28, and defined in another file. The correspondence definition 29 in the example of FIG. 3 indicates use of: three interfaces of "getDataA", "getStateD", and "doSomething" in the state S1; three interfaces of "getDataA", "getCurrentState", and "OnNotifyE2" in the state S2; and three interfaces of "getListC", "getCurrentState", and "doSomething" in the state S3.

The interface definition 9 includes a definition of an interface between the user interface execution unit 14 of the user interface execution apparatus 2 and the data providing unit 3, and a definition of the maximum size of data obtained from the data providing unit 3 based on the interface. The interface definition 9 indicates what type of interface the interface is. In the example of FIG. 3, an interface starting from "get" indicates an interface that obtains data from the data providing unit 3 (data obtaining interface). An interface starting from "do" indicates an interface that instructs the data providing unit 3 (instructing interface). An interface starting from "OnNotify" indicates an interface that notifies an event from the data providing unit 3 to the user interface execution unit 14 (event notification interface).

Although indicating an implicit definition in accordance with a described rule in Embodiment 1, the interface definition 9 may explicitly declare, for example, a data obtainment interface to be a "getter", an instructing interface to be a "method", and an event notification interface to be an "event" before designating the respective types.

In the example of FIG. 3, the interface definition 9 defines an interface named "serviceA" for the data providing unit 3 as four types of data obtaining interfaces, one type of an instructing interface, and one type of an event notification interface.

Furthermore, the interface definition 9 can define the maximum size of data obtained from the data providing unit 3 based on the data obtaining interfaces. The interface definition 9 in the example of FIG. 3 defines respective data sizes of "DataA" as 4 bytes, "StringB" as 4×256 bytes, and "StateD" as 16 bytes, and the maximum holding size of "ListC" as 16×256+8 bytes.

The state transition generating unit 10 generates the state transition code 30 based on the state transition definition 8. In the example of FIG. 3, the state transition code 30 indicates that the state S1 transitions to the state S2 upon receipt of the event E1. Furthermore, the state transition generating unit 10 generates the state transition code 30 for: reading "getDataA" and "getStateD" that are the data obtaining interfaces defined in the state S1 of the correspondence definition 29; executing "subscribe_DataA( )" and "subscribe_StateD( )" when a state transitions to the state S1; and executing "unsubscribe_DataA( )" and "unsubscribe_StateD( )" when the state S1 transitions to another state.

The prefetch generating unit 11 generates the prefetch execution code 31 based on the state transition definition 8 and the interface definition 9. In the example of FIG. 3, the prefetch generating unit 11 generates the prefetch execution code 31 including "subscribe_DataA( )" and "subscribe_StateD( )" that are called from the state transition code 30, and "getDataA( )" and "getStateD( )" that are the data obtaining interfaces for obtaining data from the data obtaining unit 15. "subscribe_DataA" determines that "DataA" is of int type according to the interface definition 9, and adds the size of int to an argument to call the subscribe method for performing a prefetch process. Furthermore, a get method that is a data obtaining interface generates a code for converting data into int and retrieving data from the data storage 16. The same holds true for "StateD".

Furthermore, the prefetch generating unit 11 calculates the maximum size of the data storage 16 of the user interface execution apparatus 2 which stores data provided from the data providing unit 3, based on the prefetch execution code 31 generated by the prefetch generating unit 11 and the definition of the maximum size of data that is included in the interface definition 9, where the data is in a state defined by the state transition definition 8.

Figures 8, 9:
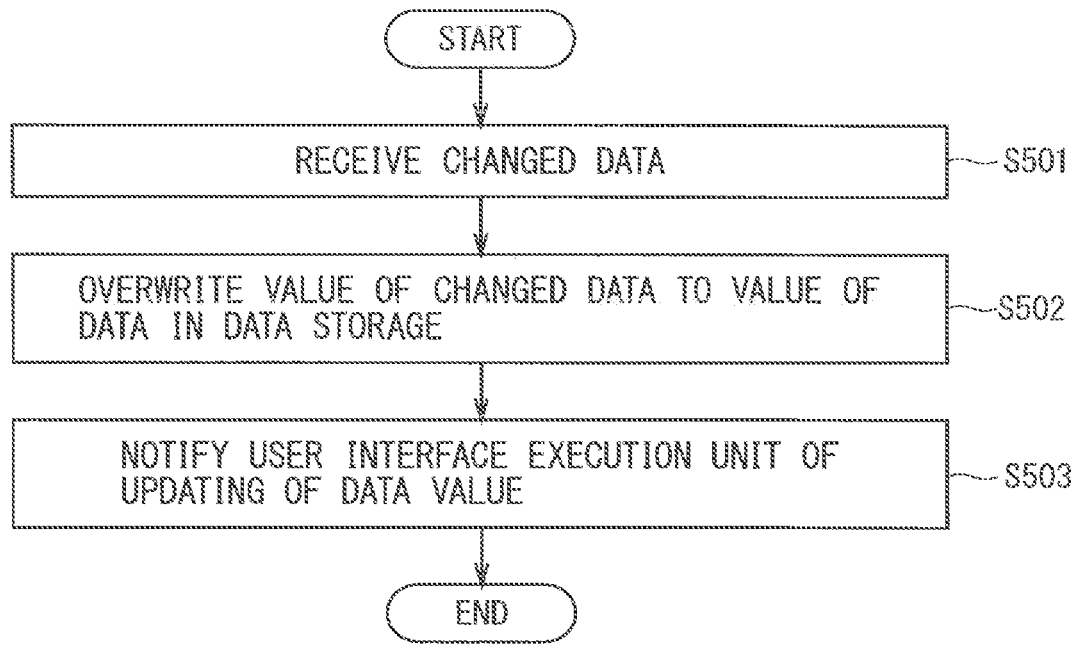
FIG. 8 is a flowchart illustrating example operations when the user interface execution apparatus receives changed data according to Embodiment 1 of the present invention.
FIG. 9 illustrates an example data format managed by a data storage according to Embodiment 1 of the present invention.

The data-obtaining generating unit 12 generates the accumulated data access code 32 based on the interface definition 9. In the example of FIG. 3, the data-obtaining generating unit 12 generates a code for generating an entry in the data storage 16 based on the interfaces defined by the interface definition 9, and generates a code for storing, in the data storage 16, data returned in response to a prefetch request transmitted to the data providing unit 3. The entry is configured, for example, by combination of a key and a value as illustrated in FIG. 9 (which will be detailed later).

Furthermore, the data-obtaining generating unit 12 generates a callback function for receiving notification of change (update) in value from the data providing unit 3. Furthermore, the data-obtaining generating unit 12 defines "doSomething( )" that is an interface different from the data obtainment interface defined by the interface definition 9, "OnNotifyE2( )" that is a call code, and a callback interface.

In the example of FIG. 3, the prefetch request for the data represented by "key" is passed to the data providing unit 3 by executing a process described in line 5 of the accumulated data access code 32. In response, the latest value (data value) at the current time is returned, and the value is recorded into the data storage 16 by executing processes described in lines 4 to 5. Although the value is returned from the data providing unit 3 through a synchronous process in the example of FIG. 3, the process of returning the value may be performed by callback to respond in asynchronous manner. The processes from line 20 of the accumulated data access code 32 indicate an example callback function for receiving a data update notification from the data providing unit 3. A callback function named "OnNotifyDataA" is generated for the interface named "getDataA". With the callback function, the data storage 16 is updated, and a notification is sent to the user interface execution unit 14.

The accumulated data access code 32 includes at least one of: a code for generating an entry of a predetermined size in the data storage 16 to call a prefetch start process; a code for deleting data in response to a prefetch cancellation request and transmitting the prefetch cancellation request to the data providing unit 3; a code for obtaining predetermined data from the data storage 16; and a code for updating data of the data storage 16 based on a data update notification received from the data providing unit 3.

The prefetch management generating unit 13 generates the prefetch management code 33 to be used by the prefetch management unit 23, based on the interface definition 9. In the example of FIG. 3, the prefetch management generating unit 13 generates respective codes corresponding to a prefetch request (subscribe) and a prefetch cancellation request (unsubscribe) of "serviceA" provided by the data providing unit 3, based on the interface definition 9. In other words, the prefetch management generating unit 13 generates the prefetch management code 33 for managing by the data providing unit 3 whether the data provided from the data providing unit 3 to the user interface execution apparatus 2 is to be prefetched.

A prefetch request code corresponding to a prefetch request executes a code for registering in the prefetch management unit 23 a client who requests prefetch and data to be prefetched, and calls a process such as "onCall_get-DataA( )" for which the developer of the data providing unit 3 actually describes a program. A prefetch cancellation request code corresponding to a prefetch cancellation request generates, for the prefetch management unit 23, a code for canceling registration of the client who requests prefetch and the data to be prefetched.

Furthermore, the prefetch management generating unit 13 generates a process (setDataA) for changing the data value to be prefetched. When the developer of the data providing unit 3 calls the process, it is determined whether the relevant data (data, for example, changed by the developer) is in a prefetch state. When the data is in a prefetch state, a data change notification is issued to a client, that is, the user interface execution unit 14 of the user interface execution apparatus 2.

[Operations]

Figure 4:
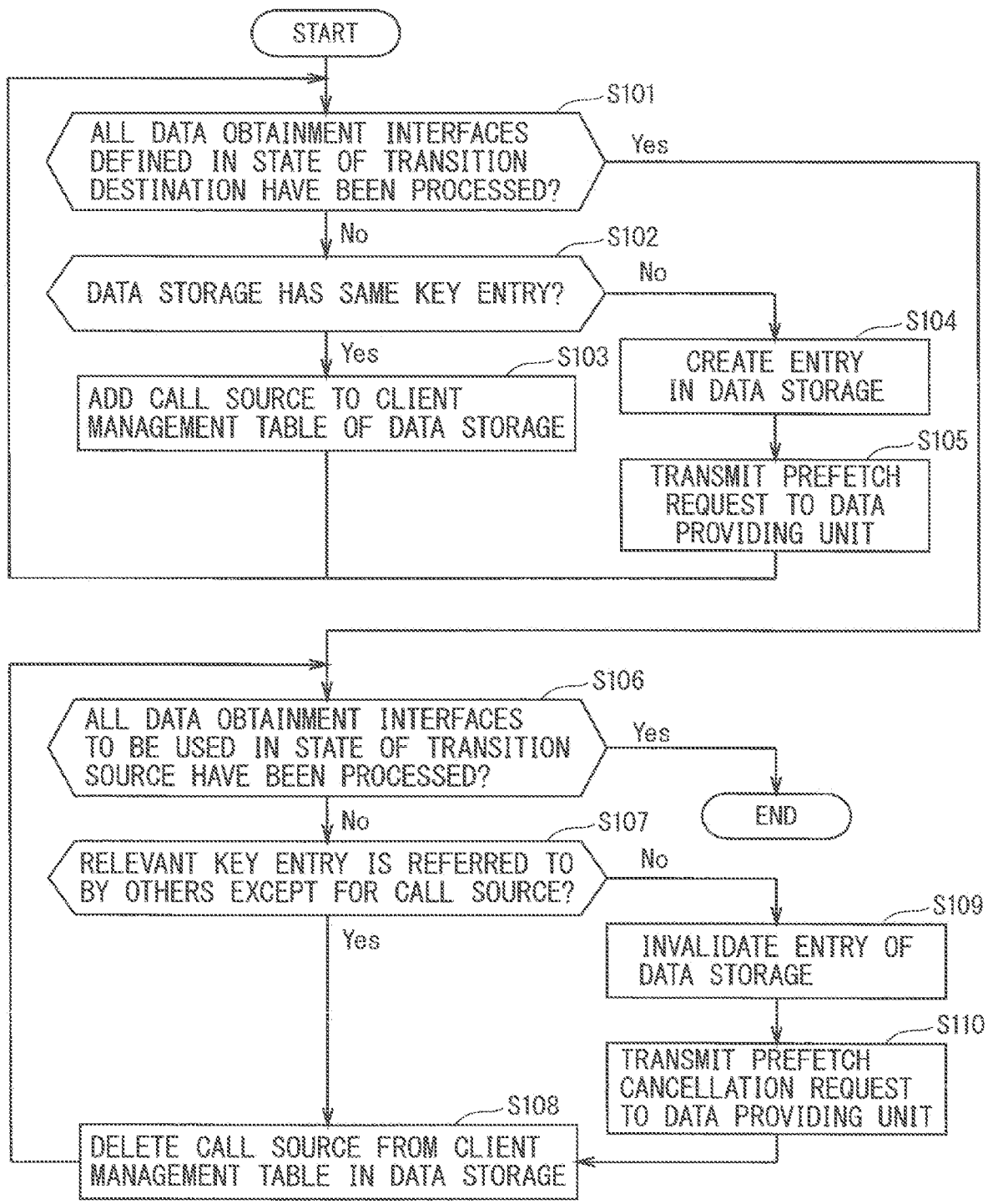
FIG. 4 is a flowchart illustrating example operations of the user interface execution apparatus according to Embodiment 1 of the present invention.

FIG. 4 is a flowchart illustrating example operations of the user interface execution apparatus 2. FIG. 4 illustrates a process flow when the state transition unit 18 transitions a state according to an event input from the input device 4 or the data obtaining unit 15 to the event obtaining unit 17. Steps S101 to S105 will be described, for example, when a transition destination is in the state S1. Furthermore, Steps S106 to S110 will be described, for example, when a transition source is in the state S1.

At Step S101, the state transition unit 18 determines whether all the data obtainment interfaces defined in the state of the transition destination have been processed, upon execution of a state transition. The process at Step S101 may be performed in a loop structure as illustrated in FIG. 4, or in a loop extended from the correspondence definition 29 at the time of design. Since the data obtaining interfaces used in the state S1 are "getDataA" and "getStateD" in the example of FIG. 3, when the process executed by S1.onenter described in lines 4 to 7 of the state transition code 30 is generated, the loop is extended to obtain "DataA" and "StateD". When all the data obtaining interfaces have been processed, the processes proceed to Step S106. When all the data obtaining interfaces are not processed, the processes proceed to Step S102.

At Step S102, the data obtaining unit 15 determines whether the data storage 16 has the same key entry. In the example of FIG. 3, Step S102 corresponds to a process to be executed by "isSubscribed" in line 2 of the accumulated data access code 32. When the same key entry exists, the processes proceed to Step S103. When the same key entry does not exist, the processes proceed to Step S104.

At Step S103, the data obtaining unit 15 stores (adds) a call source of an entry (client who has called the prefetch process; herein, the user interface execution unit 14) in a client management table of the data storage 16 through a process executed by "add" in line 7 of the accumulated data access code 32. The client management table (see FIG. 13) will be detailed later in Embodiment 3.

At Step S104, the data obtaining unit 15 creates a new entry in the data storage 16, using a data name and a service name as keys.

At Step S105, the data obtaining unit 15 transmits a prefetch request to the data providing unit 3 that is a server.

At Step S106, the state transition unit 18 determines whether all the data obtainment interfaces to be used in a state of the transition source have been processed. In the example of FIG. 3, Step S106 corresponds to a process executed by "onleave" in lines 8 to 11 of the state transition code 30. Lines 8 to 11 of the state transition code 30 describe the process when the state S1 transitions to the state S2 upon receipt of the event E1. The process at Step S106 may be performed in a loop extended from the correspondence definition 29 at the time of design, similarly as Step S101. When all the data obtaining interfaces have been processed, the processes end. When all the data obtaining interfaces are not processed, the processes proceed to Step S107.

At Step S107, the data obtaining unit 15 accesses the client management table of the data storage 16, and determines whether the relevant key entry is referred to by others except for the call source. When the relevant key entry is referred to by the others except for the call source, the processes proceed to Step S108. When the relevant key entry is referred to solely by the call source, the processes proceed to Step S109. When the number of the user interface execution units 14 is one as according to Embodiment 1, the processes proceed to Step S109.

At Step S108, the data obtaining unit 15 deletes the call source from the client management table in the data storage 16.

At Step S109, the data obtaining unit 15 invalidates or cancels (deletes) the relevant key entry of the data storage 16. When the entry is invalidated, it is necessary to preset an invalidation flag to each entry (see FIG. 9). The invalidation flag is set to "false" when the entry is invalidated, and is set to "true" when the entry is validated.

At Step S110, the data obtaining unit 15 transmits the prefetch cancellation request to the data providing unit 3, based on an instruction for the prefetch cancellation request from the data requesting unit 20. In the example of FIG. 3, the code described in lines 9 to 12 of the accumulated data access code 32 corresponds to the process for the prefetch cancellation request.

Figure 5:
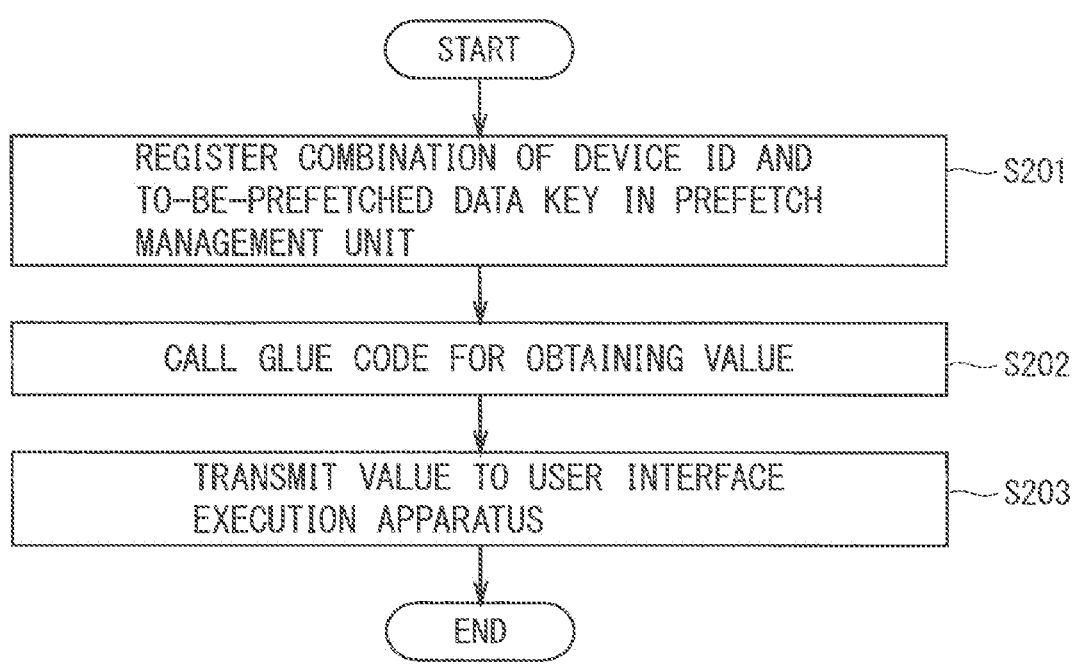
FIG. 5 is a flowchart illustrating example operations when the data providing unit receives a prefetch request according to Embodiment 1 of the present invention.

FIG. 5 is a flowchart illustrating example operations when the data providing unit 3 receives the prefetch request. FIG. 5 illustrates a process flow through the process at Step S105 in FIG. 4 when the data providing unit 3 receives the prefetch request transmitted from the data obtaining unit 15.

At Step S201, upon receipt of the prefetch request from the data obtaining unit 15, the request processor 22 registers, in the prefetch management unit 23, a combination of a device ID that is an ID for identifying the user interface execution unit 14 (client) that has transmitted the prefetch request and a to-be-prefetched data key for identifying data to be prefetched. In the example of FIG. 3, Step S201 corresponds to a process described in line 2 of the prefetch management code 33.

At Step S202, the request processor 22 calls glue code for obtaining a value of the data providing unit 3. The glue code is a process for enabling the developer of the data providing unit 3 to freely describe an inner process (program), and is the same as the code to be processed when an interface for obtaining a value from the user interface execution unit 14 that is a client is called. In the example of FIG. 3, Step S202 corresponds to each of the processes described in lines 5 and 7 of the prefetch management code 33.

At Step S203, the response returning unit 24 returns the value obtained at Step S202 to the user interface execution apparatus 2 according to the mechanism of a remote procedure call (RPC).

Figure 6:
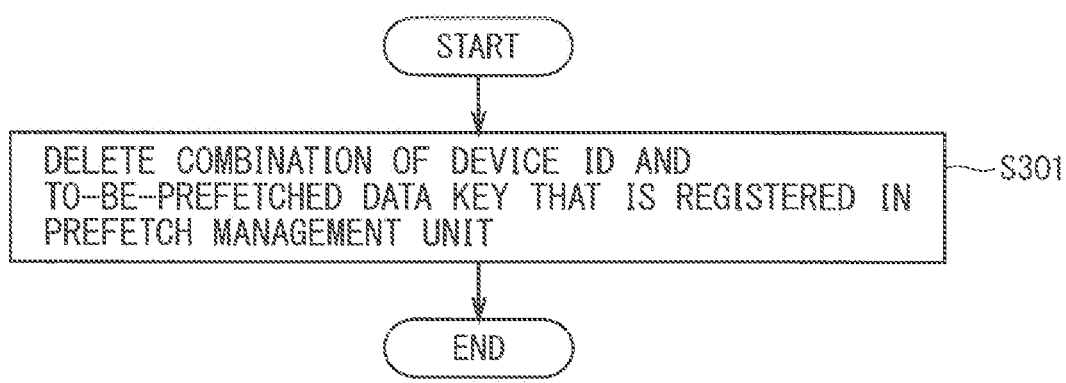
FIG. 6 is a flowchart illustrating an example operation when the data providing unit receives a prefetch cancellation request according to Embodiment 1 of the present invention.

FIG. 6 is a flowchart illustrating an example operation when the data providing unit 3 receives the prefetch cancellation request. FIG. 6 illustrates a process flow through the process at Step S110 in FIG. 4 when the data providing unit 3 receives the prefetch cancellation request transmitted from the data obtaining unit 15.

At Step S301, upon receipt of the prefetch cancellation request from the data obtaining unit 15, the request processor 22 deletes the combination of the device ID and the to-be-prefetched data key that is registered in the prefetch management unit 23. Through the process, the data providing unit 3 does not recognize the correspondence between the user interface execution unit 14 (client) and data to be prefetched, so that the prefetch state is cancelled.

Figure 7:
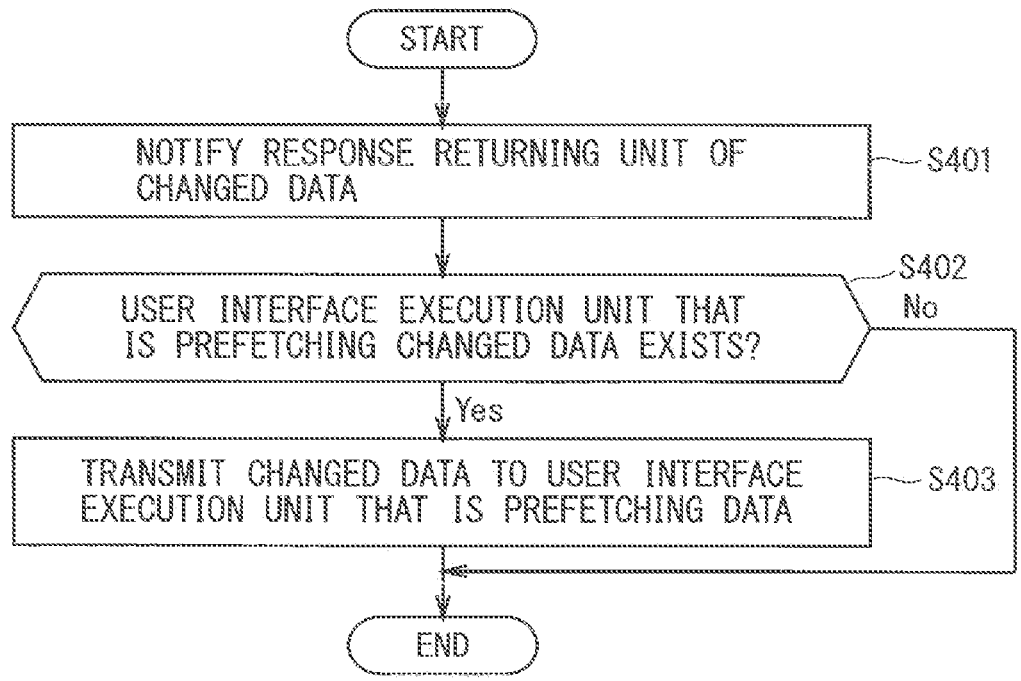
FIG. 7 is a flowchart illustrating example operations when the data providing unit updates a value according to Embodiment 1 of the present invention.

FIG. 7 is a flowchart illustrating example operations when the data providing unit 3 updates a value.

The data generating processor 25 in the data providing unit 3 generates data independently from the user interface execution apparatus 2. In the process of generating the data, a value of data in a prefetch state is sometimes changed. FIG. 7 illustrates a process flow when the value of data is changed (updated). The data whose value has been changed will be hereinafter referred to as changed data.

At Step S401, the data generating processor 25 notifies the response returning unit 24 of the changed data.

At Step S402, the response returning unit 24 determines whether the user interface execution unit 14 that is prefetching the changed data exists, with reference to combinations of the device IDs and the to-be-prefetched data keys that are registered in the prefetch management unit 23. When the user interface execution unit 14 that is prefetching the changed data exists, the processes proceed to Step S403. When the user interface execution unit 14 that is prefetching the changed data does not exist, the processes end.

At Step S403, the response returning unit 24 transmits the changed data and the to-be-prefetched data key corresponding to the changed data, to the user interface execution unit 14 that is prefetching the data.

FIG. 8 is a flowchart illustrating example operations when the user interface execution apparatus 2 receives the changed data.

At Step S501, the data obtaining unit 15 receives the changed data from the response returning unit 24 of the data providing unit 3.

At Step S502, the data obtaining unit 15 searches the data storage 16 for relevant data based on the changed data and the to-be-prefetched data key corresponding to the changed data, and overwrites the value of the changed data to a value of the relevant data.

At Step S503, the data obtaining unit 15 notifies the user interface execution unit 14 that is using the relevant data of updating of the data value. The event obtaining unit 17 that has received the notification performs a process such as updating a value to be presented by the presentation device 5, according to the event.

FIG. 9 illustrates an example data format managed by the data storage 16.

The data storage 16 stores the data provided from the data providing unit 3 as combinations of keys and values. The keys are character strings after "get" of the data obtainment interfaces (interfaces starting from "get") defined by the interface definition 9. When the interface definition 9 defines, for example, the interface named "getDataA", the key of the data obtained based on the interface is "DataA". Furthermore, when the type obtained based on a data obtaining interface is a collection type such as a list type, a fixed-form word such as "length", "name", or "item" is added after each key to simultaneously store parameters necessary to handle the list type.

Furthermore, when the interface "get" can specify an argument, there is an intention of changing the data to be obtained by the argument. Thus, adding the argument to the end of "key" guarantees identification of the data. Specifically, when the interface named "getListC(int id)" exists, the key for storing the length of "ListC" obtained by "id=1" is indicated by "ListC_length_1". According to such a method of determining the key, data of "ListC" obtained by "getListC(1)" and data of "ListC" obtained by "getListC(2)" can be separately stored in the data storage 16.

Values are stored directly as the data values provided from the data providing unit 3. All the data values according to Embodiment 1 are stored as character strings in JavaScript Object Notation (JSON) format. The data obtaining unit 15 converts the data obtained from the data storage 16 into the format defined by the interface, and transmits the data to the user interface execution unit 14.

FIG. 10 illustrates example prefetch management data managed by the prefetch management unit 23.

The prefetch management unit 23 manages prefetch states of the data that has been interpreted from the interface definition 9 that is contained in the prefetch management code 33, by combinations of key and subscribe. The data in a prefetch state is set to "true", and the data in a non-prefetch state is set to "false".

The example of FIG. 10 illustrates that, among the data items interpreted from the interface definition 9, the data item whose key is "StringB" is in a non-prefetch state and the data items with other keys are in a prefetch state. For example, when the data generating processor 25 calls a method for updating the data named "StringB" and updates the data, the response returning unit 24 does not notify the user interface execution unit 14 of the updated data because it recognizes that the data named "StringB" is in a non-prefetch state with reference to the prefetch management data managed by the prefetch management unit 23. When the data generating processor 25 calls a method for updating the data named "DataA" and updates the data, the response returning unit 24 refers to the prefetch management data managed by the prefetch management unit 23 and notifies the user interface execution unit 14 that is in a prefetch state of the updated data.

Since the user interface execution unit 14 that is in a non-prefetch state is not notified of unnecessary data through such management, it is possible to reduce the communication traffic between the user interface execution apparatus 2 and the data providing unit 3, and wasteful software processes performed by the user interface execution apparatus 2.

EXAMPLE

Application of the user interface execution apparatus 2 and the data providing unit 3 to a car navigation system will be hereinafter described.

The user interface execution apparatus 2 corresponds to a car navigation system installed in a dashboard of a vehicle. The input device 4 is a steering remote controller mounted on a steering of a driver, a H/W key installed in the car navigation system, or an infrared remote controller. The presentation device 5 is a liquid crystal panel of the car navigation system. The data providing unit 3 corresponds to a program information distribution service in a radio program that is performed by a server on the Internet through a network. Furthermore, "SongInfo getSongInfo(station_id)" that is a data obtainment interface is defined as the interface definition 9.

The state transition unit 18 of the user interface execution apparatus 2 receives the state transition code 30 from the state transition generating unit 10 of the user interface designing apparatus 1. Furthermore, the data requesting unit 20 receives the prefetch execution code 31 from the prefetch generating unit 11 of the user interface designing apparatus 1. Furthermore, the data obtaining unit 15 receives the accumulated data access code 32 from the data-obtaining generating unit 12 of the user interface designing apparatus 1.

The prefetch management unit 23 of the data providing unit 3 receives the prefetch management code 33 from the prefetch management generating unit 13 of the user interface designing apparatus 1.

The user's operation on the input device 4 causes the data requesting unit 20 to execute "subscribe_SongInfo(station1)" that is the prefetch execution code 31 when the user interface execution unit 14 is in a state of transitioning to an information display screen of the radio program with a predetermined number of operations from a state. Then, the data obtaining unit 15 adds to the data storage 16 an item (entry) of "SongInfo_station1", and transmits a prefetch request to the data providing unit 3. Here, "device1" that is device ID of the car navigation system (user interface execution apparatus 2) that is a client who has issued the prefetch request, and "SongInfo_station1" that is a key are transmitted as the prefetch request.

When the request processor 22 in the data providing unit 3 receives the prefetch request from the user interface execution apparatus 2, it registers in the prefetch management unit 23 that "SongInfo_station1" is to be prefetched by "device1". Then, the response returning unit 24 returns current "SongInfo" of "station1" to the user interface execution apparatus 2.

The data obtaining unit 15 that has received "SongInfo" of "station1" from the data providing unit 3 records "SongInfo" of "station1" as a value corresponding to "SongInfo_station1" that is a key of the data storage 16, and notifies the event obtaining unit 17 of completion of the prefetch.

Then, when the state transitions to a radio program display screen according to the user's operation and the data requesting unit 20 causes the data obtaining unit 15 to execute "getSongInfo(station1)", the data obtaining unit 15 transmits "SongInfo" of "station1" recorded in the data storage 16 to the data processor 19.

With such operations, the user interface execution unit 14 can reduce the process of requesting the data providing unit 3 to obtain data with the timing for requiring the data.

Furthermore, when a musical piece that is being distributed in a radio program is changed after a lapse of time, the response returning unit 24 of the data providing unit 3 recognizes that "SongInfo" is in a prefetch state with reference to the prefetch management data managed by the prefetch management unit 23. Then, the response returning unit 24 notifies the data obtaining unit 15 of the user interface execution apparatus 2 of changed information. Upon receipt of the changed information, the data obtaining unit 15 overwrites the changed information to a value of the data storage 16 to update the value, and notifies the event obtaining unit 17 of the changed information.

Accordingly, the user interface execution unit 14 can always obtain the latest information from the data providing unit 3 when the user interface execution unit 14 is in a prefetch state. Thus, since the user interface execution unit 14 does not have to successively request the data providing unit 3 with large delay to provide data, it is possible to, for example, transition between screens or draw a screen at high speeds and provide the user with a comfortable sense of operation.

Furthermore, when the number of the user's operations until reaching an information providing screen of a radio program, for example, starting playback of a CD, is predetermined or more, the data requesting unit 20 executes "unsubscribe_SongInfo(station1)" that is a prefetch cancellation request in the prefetch execution code 31 to cause the data obtaining unit 15 to invalidate or cancel "SongInfo" of "station1" in the data storage 16. The data obtaining unit 15 transmits the prefetch cancellation request to the data providing unit 3. The request processor 22 of the data providing unit 3 deletes information indicating that "SongInfo_station1" is to be prefetched by "device 1", from the prefetch management data managed by the prefetch management unit 23 according to the received prefetch cancellation request.

Since execution of the prefetch cancellation request by the data requesting unit 20 enables data of the user interface execution unit 14 that transitions from a certain state to a prefetch state to be identified, data stored in the data storage 16 that is necessary for operating the user interface execution apparatus 2 can be identified when a code (accumulated data access code) for determining this process (process in response to the prefetch cancellation request) is generated. Thus, the capacity of the data storage 16 necessary for operating the user interface execution apparatus 2 can be estimated when a user interface is designed, by predefining the maximum size of each data item (data necessary in each state of a user interface) in the data storage 16.

According to Embodiment 1, the maximum size of a storage area for storing data to be prefetched can be estimated when a user interface is designed, and updated data can be presented to the user even when the prefetched data is updated after the prefetch.

Embodiment 2

Although Embodiment 1 describes that the user interface execution apparatus 2 and the data providing unit 3 are separately provided, they are not limited to such. The user interface execution apparatus 2 and the data providing unit 3 may be, for example, integrated into one unit.

The car navigation system described in Example of Embodiment 1 may, for example, perform a function of providing a present location while the own vehicle is traveling. The car navigation system corresponds to the user interface execution apparatus 2, and the function of providing a present location of the own vehicle corresponds to the data providing unit 3.

Figure 11:
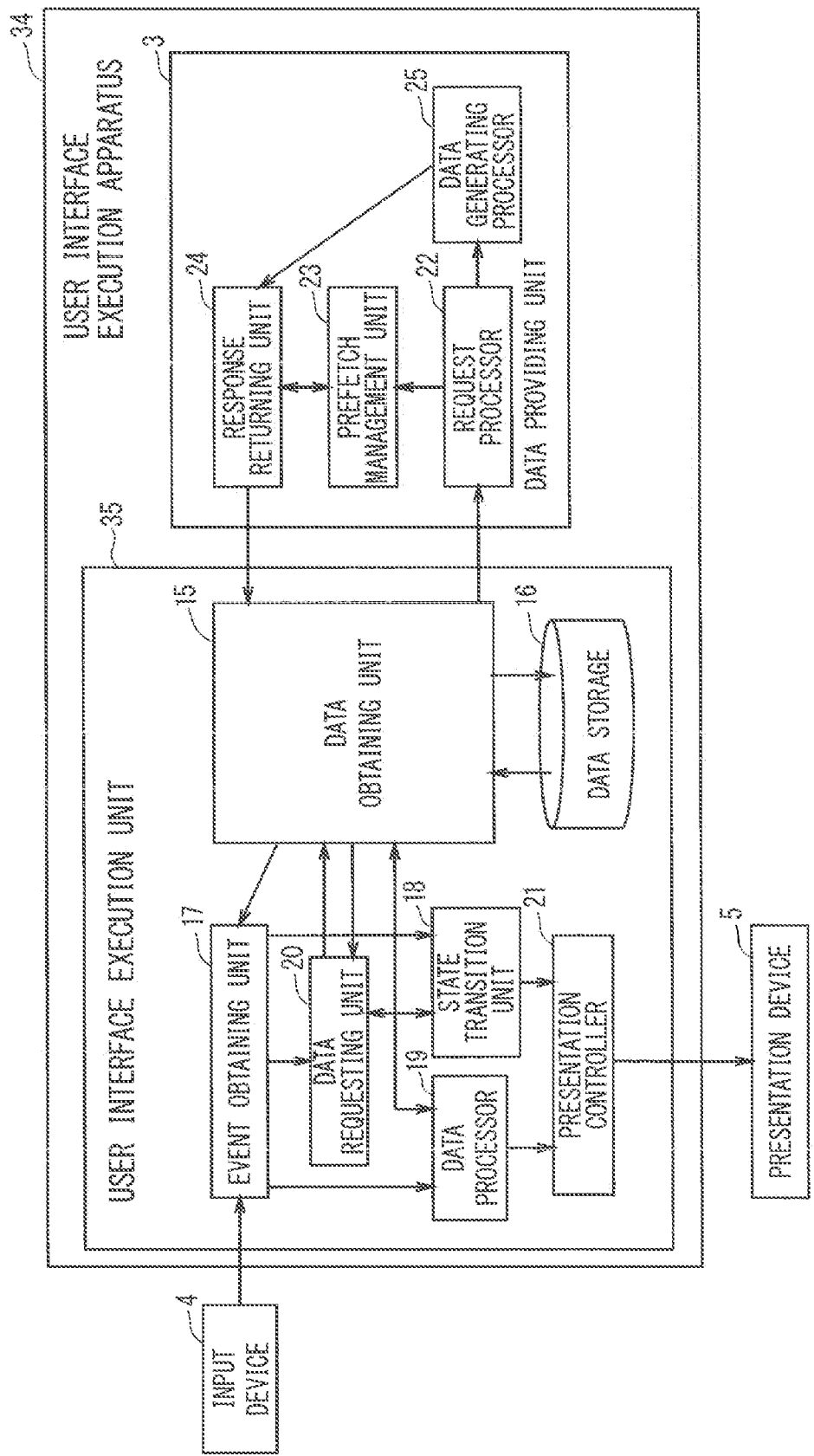
FIG. 11 is a block diagram illustrating an example configuration of a user interface execution apparatus according to Embodiment 2 of the present invention.

FIG. 11 is a block diagram illustrating an example configuration of a user interface execution apparatus 34 according to Embodiment 2.

As illustrated in FIG. 11, the user interface execution apparatus 34 is obtained by integrating the user interface execution apparatus 2 and the data providing unit 3 according to Embodiment 1 (see FIG. 1) into one unit. Furthermore, a user interface execution unit 35 is obtained by incorporating the data obtaining unit 15 and the data storage 16 into the user interface execution unit 14 according to Embodiment 1. Since the other configurations and operations are the same as those according to Embodiment 1, the description thereof will be omitted.

The user interface execution apparatus 34 includes the user interface execution unit 35 and the data providing unit 3. Thus, the delay when the user interface execution unit 35 obtains data from the data providing unit 3 will be smaller than that according to Embodiment 1. Furthermore, since the user interface execution apparatus 2 according to Embodiment 1 generally includes an operating system (OS), the user interface execution unit 14 and the data providing unit 3 have different memory spaces. Thus, a delay occurs when the user interface execution unit 14 and the data providing unit 3 pass data therebetween, and there is a problem in that the delay becomes larger as the size and the number of passed data items increase. Since the user interface execution unit 35 includes the data storage 16 according to Embodiment 2, the number of data items passed between different memory spaces can be eliminated when data is obtained.

Embodiment 3

Although Embodiments 1 and 2 describe a case where each of the user interface execution units 14 and 35 is a single unit, they are not limited to such. The number of the user interface execution units may be, for example, plural.

The car navigation system described in Example of Embodiment 1 may include user interface execution units corresponding to, for example, a display for displaying an image toward a driver, a display for displaying an image toward an assistant driver, and a display for displaying an image toward a passenger in a rear seat.

Figure 12:
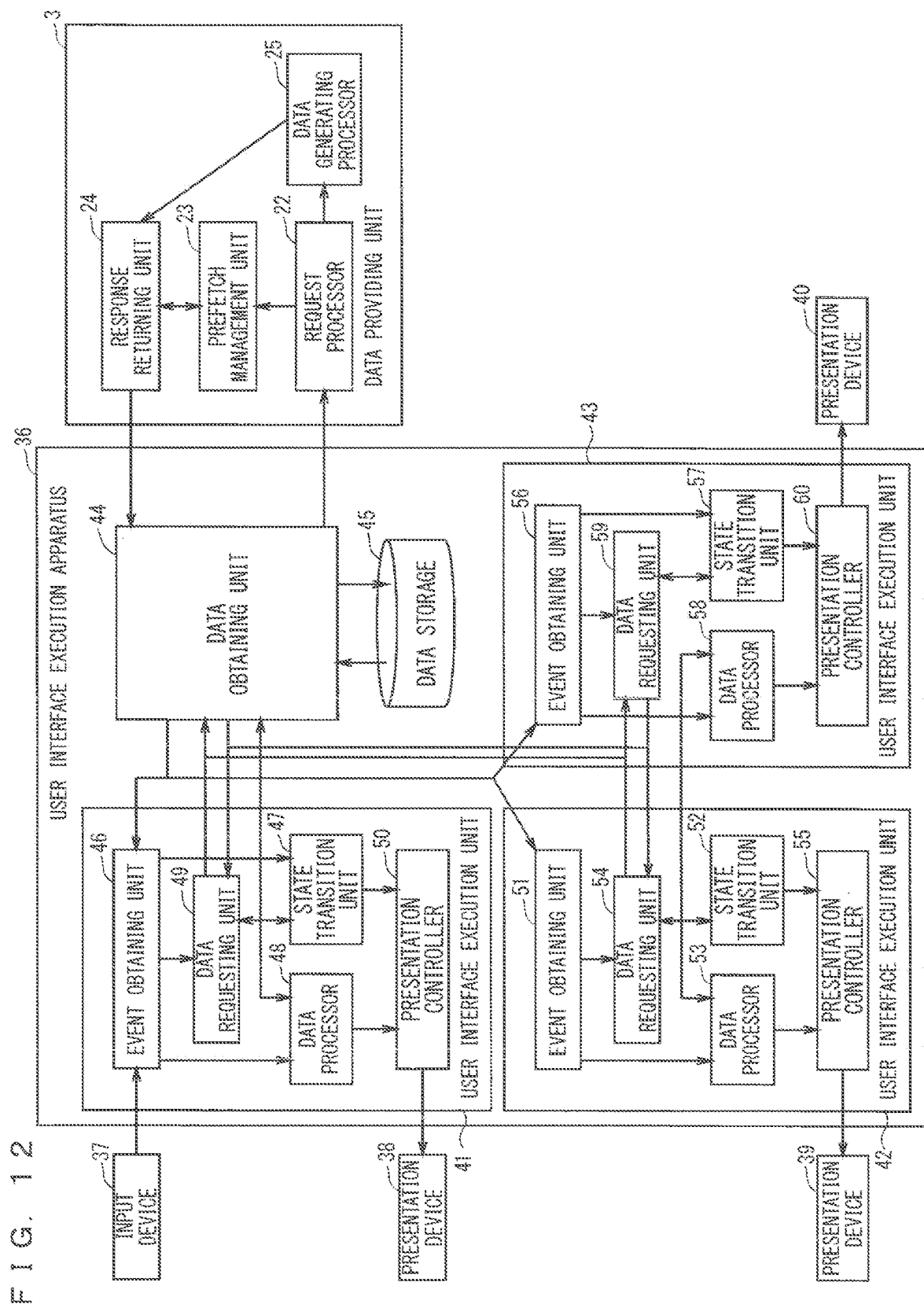
FIG. 12 is a block diagram illustrating an example configuration of a user interface execution apparatus according to Embodiment 3 of the present invention.

FIG. 12 is a block diagram illustrating an example configuration of a user interface execution apparatus 36 according to Embodiment 3 of the present invention.

As illustrated in FIG. 12, the user interface execution apparatus 36 includes user interface execution units 41, 42, and 43. Furthermore, the user interface execution unit 41 is connected to a presentation device 38, and the user interface execution unit 42 is connected to a presentation device 39, and the user interface execution unit 43 is connected to a presentation device 40. The user interface execution units 41, 42, and 43 have the same functions as those of the user interface execution unit 14 according to Embodiment 1. Since the other configurations and operations are the same as those according to Embodiment 1, the description thereof will be omitted.

Assuming that in the car navigation system, for example, the presentation device 38 is the display for displaying an image toward a driver, the presentation device 39 is the display for displaying an image toward an assistant driver, and the presentation device 40 is the display for displaying an image toward a passenger in a rear seat, different information can be displayed on each of the presentation devices 38, 39, and 40.

A data obtaining unit 44 and a data storage 45 are used in common among the user interface execution units 41, 42, and 43. With such a configuration, for example, when the user interface execution unit 42 is prefetching data necessary for the user interface execution unit 41, the user interface execution unit 41 can obtain the necessary data from the data storage 45 without issuing a prefetch request to the data providing unit 3. Accordingly, the entire user interface execution apparatus 36 can achieve faster response.

In order to achieve the operations, for example, a data requesting unit 49 of the user interface execution unit 41 informs the data obtaining unit 44 of the own instance ("this" in the example of FIG. 3) as indicated in line 4 of the prefetch execution code 31 in FIG. 3 when executing the prefetch execution code 31. The data obtaining unit 44 adds the item to the data storage 45 based on the accumulated data access code 32. The data obtaining unit 44 ends the process without newly informing the data providing unit 3 of the prefetch request, when the state is a prefetch state as indicated in line 2 of the accumulated data access code 32.

Furthermore, when, for example, the data providing unit 3 changes the value of "DataA" that is in a prefetch state, the data obtaining unit 44 that has received the changed data executes "OnNotifyDataA" in the accumulated data access code 32. The data obtaining unit 44 records the value of the changed data into the data storage 45, and then executes "OnChangeDataA" on all the user interface execution units that are prefetching "DataA".

FIG. 13 illustrates an example client management table managed by the data storage 45.

The data storage 45 stores the client management table for managing clients who read particular keys as well as managing the combinations of keys and values.

FIG. 13 indicates that "DataA" is to be prefetched by "clientA" (for example, the user interface execution unit 41) and "clientB" (for example, the user interface execution unit 42) and that "StringB" is to be prefetched by "clientA".

Consequently, even when the user interface execution apparatus 36 includes the user interface execution units 41, 42, and 43 according to Embodiment 3, the entire user interface execution apparatus 36 can achieve faster response.

Embodiment 4

Although Embodiment 3 describes that the single user interface execution apparatus 36 includes the user interface execution units 41, 42, and 43, it is not limited to such. For example, the number of the user interface execution apparatuses may be, for example, plural.

The car navigation system described in Example of Embodiment 1 may have user interface execution apparatuses, for example, a set of a car navigation unit installed in a dashboard of a vehicle and a tablet terminal that the user brings to the vehicle.

Figure 14:
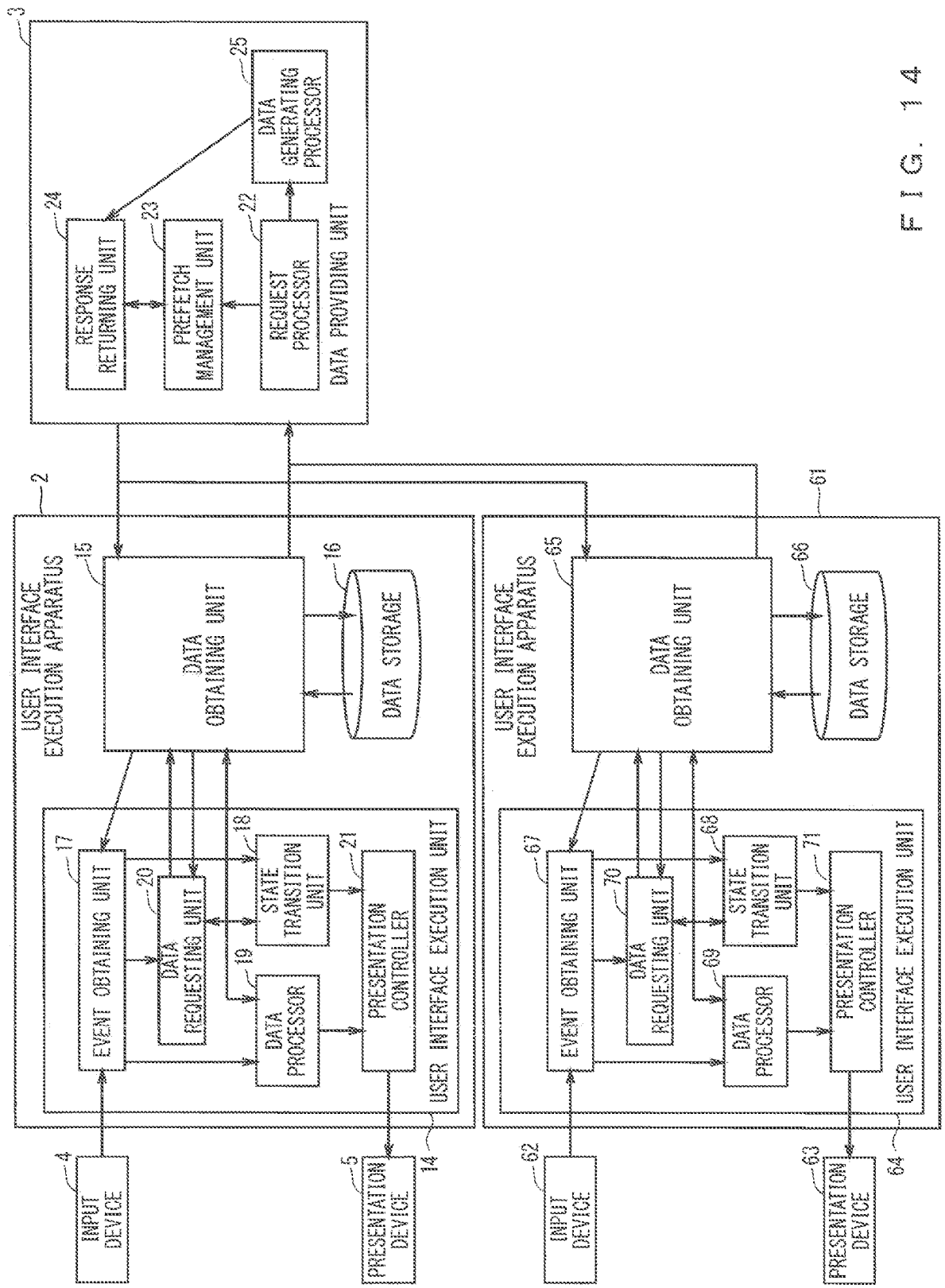
FIG. 14 is a block diagram illustrating an example configuration of a user interface execution apparatus according to Embodiment 4 of the present invention.

FIG. 14 is a block diagram illustrating an example configuration of user interface execution apparatuses 2 and 61 according to Embodiment 4 of the present invention.

As illustrated in FIG. 14, the user interface execution apparatuses 2 and 61 are provided in Embodiment 4. The user interface execution units 2 and 61 have the same functions as those of the user interface execution unit 2 according to Embodiment 1. Since the other configurations and operations are the same as those according to Embodiment 1, the description thereof will be omitted.

In the car navigation system, for example, the car navigation unit installed in a dashboard of a vehicle can be defined as the user interface execution apparatus 2, and the tablet terminal that the user brings to the vehicle can be defined as the user interface execution apparatus 61.

The user interface execution apparatuses 2 and 61 are separate apparatuses, and include data obtaining units 15 and 65 and data storages 16 and 66, respectively. The data providing unit 3 manages IDs for distinguishing between the user interface execution apparatuses 2 and 61. Specifically, in a prefetch process executed by each of the data obtaining units 15 and 65 on the data providing unit 3 based on the accumulated data access code 32 (client.serviceIF.subscribe (key) that is a process indicated in line 5 of the accumulated data access code 32 in the example of FIG. 3), device IDs for identifying the user interface execution apparatuses 2 and 61 are allocated and a subscribe code corresponding to the data providing unit 3 is called. The request processor 22 of the data providing unit 3 receives a device ID and a key of the data to be prefetched based on the prefetch management code 33, and records them in the prefetch management unit 23. Then, when the data value is changed according to the process of the data generating processor 25, the response returning unit 24 refers to the prefetch management data managed by the prefetch management unit 23 and notifies all the user interface execution apparatuses that are in a prefetch state of the changed data.

FIG. 15 illustrates example management data managed by the prefetch management unit 23.

In contrast to the management data (see FIG. 10) managed by the prefetch management unit 23 according to Embodiment 1, the management data managed by the prefetch management unit 23 according to Embodiment 4 records combinations of keys and device IDs whose devices are prefetching the key data, as illustrated in FIG. 15. The example of FIG. 15 clarifies that "DataA" is prefetched by "device1" (for example, the user interface execution apparatus 2) and "device2" (for example, the user interface execution apparatus 61). The response returning unit 24 determines when, for example, "DataA" is updated that updated data needs to be notified to "deviceA" and "deviceB", with reference to the prefetch management data managed by the prefetch management unit 23.

Consequently, Embodiment 4 can produce the same advantages as those according to Embodiment 1.

Embodiment 5

Embodiments 1 to 4 have objects of reducing the communication delay when the user interface execution apparatus obtains data from the data providing unit and estimating a capacity necessary for the data storage when a user interface is designed. Embodiment 5 according to the present invention has an object of accelerating the startup of a user interface execution apparatus with an additional mechanism for backing up the data storage.

Figure 16:
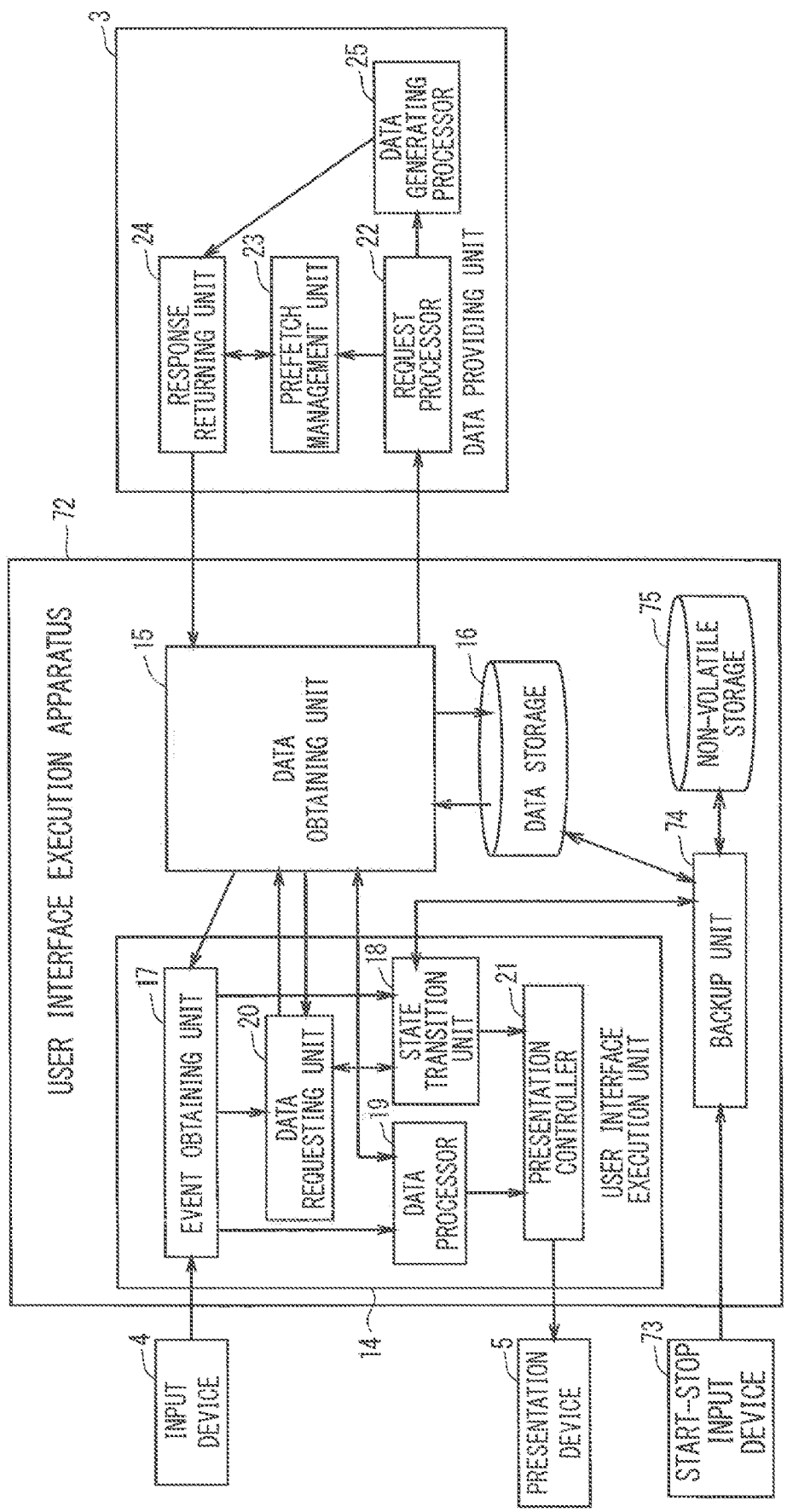
FIG. 16 is a block diagram illustrating an example configuration of a user interface execution apparatus according to Embodiment 5 of the present invention.

FIG. 16 is a block diagram illustrating an example configuration of a user interface execution apparatus 72 according to Embodiment 5.

As illustrated in FIG. 16, the user interface execution apparatus 72 includes a backup unit 74 and a non-volatile storage 75. Furthermore, the backup unit 74 is connected to a start-stop input device 73. Since the other configurations and operations are the same as those according to Embodiment 1 (FIG. 1), the description thereof will be omitted.

The start-stop input device 73 inputs a signal for starting or stopping the user interface execution apparatus 72 (a start signal, a stop signal) to the backup unit 74.

Upon input of the start signal from the start-stop input device 73, the backup unit 74 restores the content of the data storage 16 and a state of the user interface execution unit 14, using data stored in the non-volatile storage 75. Furthermore, upon input of the stop signal from the start-stop input device 73, the backup unit 74 stores (backs up) in the non-volatile storage 75 the content of the data storage 16 and a state of the user interface execution unit 14, and stops the user interface execution apparatus 72.

The non-volatile storage 75 is a storage device that can hold data without supplying power, such as an SD card (registered trademark) and a hard disk drive (HDD).

Furthermore, the interface defining unit 7 of the user interface designing apparatus 1 sets a flag indicating a data type to a data obtainment interface of the interface definition 9. Accordingly, it is possible to define whether the data obtained based on the data obtaining interface is data that is changed when the power is OFF (the user interface execution apparatus 2 is stopped).

FIG. 17 illustrates an example setting of a flag indicating a data type of a data obtainment interface in the interface definition 9.

In FIG. 17, data specifying "fixed" indicates no change even after the power is OFF, and data specifying "periodic" indicates a change even after the power is OFF. Storing such definitions in the data storage 16 enables a process of preventing the data that is changed even after the power is OFF from being backed up.

FIG. 18 illustrates an example data format managed by the data storage 16.

As illustrated in FIG. 18, the data storage 16 manages combinations of keys, values, and types. The backup unit 74 can determine which data is to be stored in the non-volatile storage 75 when the power is OFF, with reference to the data managed by the data storage 16 and illustrated in FIG. 18.

When, for example, the car navigation system described in Example of Embodiment 1 needs to save a state of its end time and restore at the next startup the application operated at the end time or information displayed on the screen, the user interface execution apparatus 72 according to Embodiment 5 stores only the data available at the next startup that is included in the data at the end time. Accordingly, since the data at the previous end time can be restored to start up without access to the data providing unit at the next startup, the startup of the user interface execution apparatus 72 can be accelerated.

Consequently, Embodiment 5 can accelerate the startup of the user interface execution apparatus 72.

Each of the transition designing unit 6, the interface defining unit 7, the state transition generating unit 10, the prefetch generating unit 11, the data-obtaining generating unit 12, the prefetch management generating unit 13, the user interface execution units 14, 35, 41, 42, 43, and 64, the data obtaining units 15, 44, and 65, the event obtaining units 17, 46, 51, 56, and 67, the state transition units 18, 47, 52, 57, and 68, the data processors 19, 48, 53, 58, and 69, the data requesting units 20, 49, 54, 59, and 70, the presentation controllers 21, 50, 55, 60, and 71, the request processor 22, the prefetch management unit 23, the response returning unit 24, the data generating processor 25, and the backup unit 74 in FIGS. 1, 11, 12, 14, and 16 has been implemented by causing the processors 26 in FIG. 2 to operate according to a software program stored in the memory 27. Each of the transition designing unit 6, the interface defining unit 7, the state transition generating unit 10, the prefetch generating unit 11, the data-obtaining generating unit 12, the prefetch management generating unit 13, the user interface execution units 14, 35, 41, 42, 43, and 64, the data obtaining units 15, 44, and 65, the event obtaining units 17, 46, 51, 56, and 67, the state transition units 18, 47, 52, 57, and 68, the data processors 19, 48, 53, 58, and 69, the data requesting units 20, 49, 54, 59, and 70, the presentation controllers 21, 50, 55, 60, and 71, the request processor 22, the prefetch management unit 23, the response returning unit 24, the data generating processor 25, and the backup unit 74 may be configured as hardware instead (for example, an arithmetic/processing circuit configured to perform a particular computation or process on an electrical signal). Furthermore, the software program and the hardware may be mixed.

Furthermore, under a concept that each of the transition designing unit 6, the interface defining unit 7, the state transition generating unit 10, the prefetch generating unit 11, the data-obtaining generating unit 12, the prefetch management generating unit 13, the user interface execution units 14, 35, 41, 42, 43, and 64, the data obtaining units 15, 44, and 65, the event obtaining units 17, 46, 51, 56, and 67, the state transition units 18, 47, 52, 57, and 68, the data processors 19, 48, 53, 58, and 69, the data requesting units 20, 49, 54, 59, and 70, the presentation controllers 21, 50, 55, 60, and 71, the request processor 22, the prefetch management unit 23, the response returning unit 24, the data generating processor 25, and the backup unit 74 that are implemented as software is combined with one of the transition designing unit 6, the interface defining unit 7, the state transition generating unit 10, the prefetch generating unit 11, the data-obtaining generating unit 12, the prefetch management generating unit 13, the user interface execution units 14, 35, 41, 42, 43, and 64, the data obtaining units 15, 44, and 65, the event obtaining units 17, 46, 51, 56, and 67, the state transition units 18, 47, 52, 57, and 68, the data processors 19, 48, 53, 58, and 69, the data requesting units 20, 49, 54, 59, and 70, the presentation controllers 21, 50, 55, 60, and 71, the request processor 22, the prefetch management unit 23, the response returning unit 24, the data generating processor 25, and the backup unit 74 that are configured as hardware, the term "unit" can be replaced with the term "processing circuit".

Embodiments can be freely combined, and appropriately modified or omitted within the scope of the invention.

Although this invention has been described in detail, the description is in all aspects illustrative and does not restrict the invention. Therefore, numerous modifications that have yet been exemplified will be devised without departing from the scope of this invention.

EXPLANATION OF REFERENCE SIGNS

1 user interface designing apparatus, 2 user interface execution apparatus, 3 data providing unit, 4 input device, 5 presentation device, 6 transition designing unit, 7 interface defining unit, 8 state transition definition, 9 interface definition, 10 state transition generating unit, 11 prefetch generating unit, 12 data-obtaining generating unit, 13 prefetch management generating unit, 14 user interface execution unit, 15 data obtaining unit, 16 data storage, 17 event obtaining unit, 18 state transition unit, 19 data processor, 20 data requesting unit, 21 presentation controller, 22 request processor, 23 prefetch management unit, 24 response returning unit, 25 data generating processor, 26 processor, 27 memory, 28 state transition diagram, 29 correspondence definition, 30 state transition code, 31 prefetch execution code, 32 accumulated data access code, 33 prefetch management code, 34 user interface execution apparatus, 35 user interface execution unit, 36 user interface execution apparatus, 37 input device, 38, 39, 40 presentation device, 41, 42, 43 user interface execution unit, 44 data obtaining unit, 45 data storage, 46 event obtaining unit, 47 state transition unit, 48 data processor, 49 data requesting unit, 50 presentation controller, 51 event obtaining unit, 52 state transition unit, 53 data processor, 54 data requesting unit, 55 presentation controller, 56 event obtaining unit, 57 state transition unit, 58 data processor, 59 data requesting unit, 60 presentation controller, 61 user interface execution apparatus, 62 input device, 63 presentation device, 64 user interface execution unit, 65 data obtaining unit, 66 data storage, 67 event obtaining unit, 68 state transition unit, 69 data processor, 70 data requesting unit, 71 presentation controller, 72 user interface execution apparatus, 73 start-stop input device, 74 backup unit, 75 non-volatile storage.

The invention claimed is:

1. A user interface execution apparatus that executes operation content of a user based on a code generated by a user interface designing apparatus that designs a user interface, said user interface execution apparatus comprising:

a processor to execute a program; and
a memory to store the program which, when executed by the processor, performs processes of:
transitioning a state of said user interface execution apparatus based on said code and said operation content of said user;
issuing a prefetch request for data to a data providing unit, said prefetch request being generated by said user interface designing apparatus based on a data obtaining interface included in said code statically defined in association with said state of said user interface execution apparatus;
storing said data obtained from said data providing unit in response to said prefetch request issued in said issuing;
generating said code from an interface definition defined as an interface between said user interface execution apparatus and said data providing unit, and a state transition definition that defines said transitioning of a state, said interface definition and said state transition definition being designed by said user interface designing apparatus; and
selecting, before transitioning said state, data to be prefetched based on a difference between a data obtaining interface to be used in a state before said transitioning and a data obtaining interface to be used in a state after said transitioning.

2. The user interface execution apparatus according to claim 1,
wherein, when said program is executed by the processor, further performs a process of issuing a prefetch cancellation request for data to said data providing unit based on said difference, when said prefetch request issued to said data providing unit is transitioned to an unnecessary state.

3. The user interface execution apparatus according to claim 2,
wherein, when said program is executed by the processor, performs further processes of:
issuing a plurality of requests;
storing, in association with each of said requests, an identifier for identifying a call source that requests data when said prefetch request is issued; and
issuing said prefetch cancellation request to said data providing unit as one of said requests when a call source other than said call source is not stored.

4. The user interface execution apparatus according to claim 1,
wherein, when said program is executed by the processor, further performs a process of storing a type indicating whether data has no change after power is OFF.

5. A user interface designing apparatus that designs a user interface, said apparatus comprising:
a processor to execute a program; and
a memory to store the program which, when executed by the processor, performs processes of:
defining a state transition definition that defines transitioning of a state of said user interface;
defining an interface definition that defines an interface between a user interface execution apparatus and a data providing unit, said user interface execution apparatus executing said user interface, said data providing unit providing data to said user interface execution apparatus; and
automatically generating a code for issuing both a prefetch request and a prefetch cancellation request for said data to said data providing unit, based on said state transition definition and said interface definition defined in said defining of an interface definition, said state transition definition including a correspondence definition that defines a correspondence of said interface that may be used in each state defined in said defining of a state transition definition.

6. The user interface designing apparatus according to claim 5, wherein the process of automatically generating the code for issuing the prefetch request and the prefetch cancellation request for said data to said data providing unit comprises generating code for:
  storing, in association with the prefetch request, an identifier for identifying a call source that requests data when the prefetch request is issued; and
  issuing the prefetch cancellation request to the data providing unit when a call source is other than the stored call source.

* * * * *